Nov. 24, 1953  R. J. WAGNER ET AL  2,660,658
COOKING APPARATUS
Filed June 12, 1951  2 Sheets-Sheet 1
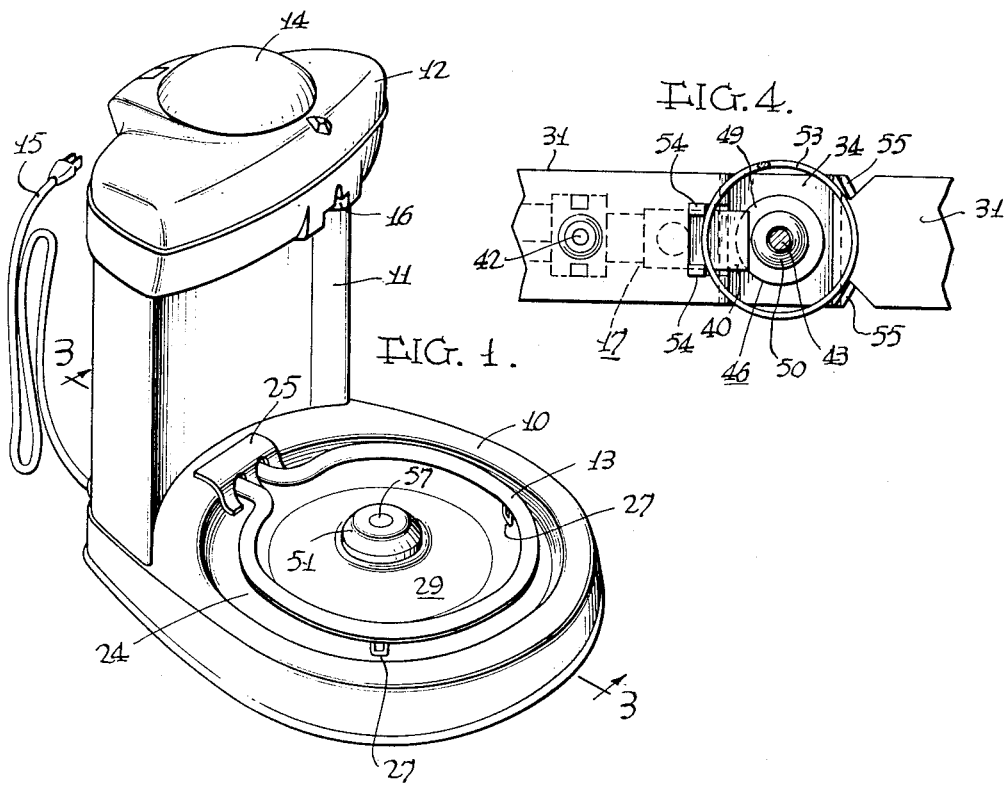
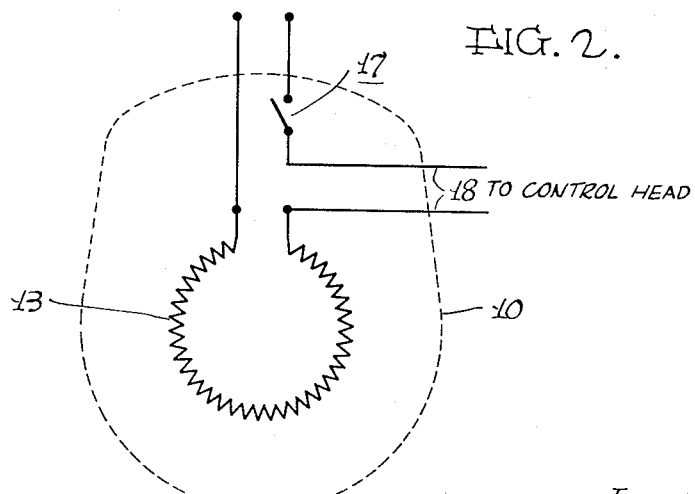
Inventors:
Robert J. Wagner &
Harvey E. Hortman Jr.,
by their Attorneys
Howson & Howson

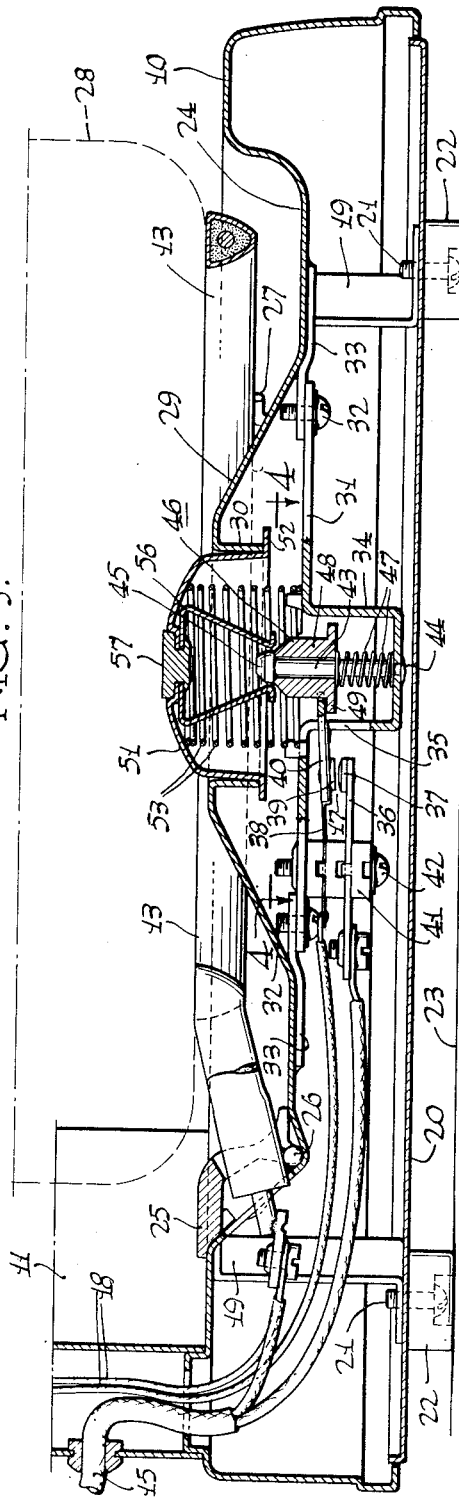

Patented Nov. 24, 1953

2,660,658

UNITED STATES PATENT OFFICE 2,660,658

COOKING APPARATUS

Robert J. Wagner, Philadelphia, and Harvey E. Hortman, Jr., Southampton, Pa., assignors to Proctor Electric Company, Philadelphia, Pa., a corporation of Pennsylvania Application June 12, 1951, Serial No. 231,226

13 Claims. (Cl. 219—43)

This invention relates to cooking apparatus and more particularly to the control of energization of an electric heating unit on which a cooking vessel is to be placed.

While the invention is useful in any instance where such a vessel-receiving heating unit is employed, it is particularly intended for use with a pressure cooker-controlling apparatus of the character disclosed and claimed in our copending application Serial No. 231,224, filed June 12, 1951. In such an apparatus it is desirable that the electric heating unit shall not be energized unless a cooking vessel is placed thereon, and it is also desirable that the heating unit shall be deenergized in the event that the temperature of the cooking vessel becomes excessively high.

One object of the present invention is to provide a novel mechanism for such control of an electric heating unit.

Another object of the invention is to provide such a mechanism which is capable of resetting itself after operation in response to an excessive temperature condition.

For the purpose of disclosure, the invention is illustrated in the accompanying drawings as applied to a control apparatus of the character disclosed in the above-mentioned copending application, but it is to be understood that the invention is applicable in any instance in which it may be advantageously used.

In the accompanying drawings,

Fig. 1 is a small scale perspective view of the entire control apparatus;

Fig. 2 is a diagrammatic illustration of the electrical connections insofar as the present invention is concerned;

Fig. 3 is a sectional view of the base portion of the apparatus shown in Fig. 1, taken along the line 3—3 of Fig. 1, and showing the mechanism in the "off" condition;

Fig. 4 is a fragmentary sectional view taken along line 4—4 of Fig. 3;

Fig. 5 is a fragmentary sectional view similar to a portion of Fig. 3, and showing the mechanism in the "on" condition;

Fig. 6 is a similar view showing the mechanism after it has operated in response to an excessive temperature condition; and Fig. 7 is a perspective view of the thermomotive element employed in the mechanism.

Referring first to Fig. 1, the apparatus there shown is that disclosed in the above-mentioned copending application, and as indicated above its purpose is to control the operation of a pressure cooker. This apparatus is in the form of a control stand comprising a base 10 adapted to receive a cooking vessel, a vertical tower 11 extending upwardly from the base, and a control head 12 at the top of the tower 11. On the base 10 there is provided an electric heating unit 13 which is preferably in the form of a ring, and on which a pressure cooking vessel may be placed. The head 12 is hollow and contains control mechanism for automatically controlling timed pressure cooking operations according to the manual setting of a rotatable dial 14, said mechanism being electrically connected to the electrical elements of the base 10 by means of electrical conductors extending through the vertical tower 11 which is also hollow. Electrical current is supplied to the apparatus through the supply cord 15. The head 12 has a recess or opening 16 which is adapted to receive the controlling valve on a pressure cooker vessel. The above-mentioned copending application is directed particularly to the control mechanism within the head 12 with which the present invention is not concerned.

In accordance with the present invention there is provided a controlling switch mechanism on the base 10 in association with the heating unit 13. Such mechanism includes a switch 17 shown diagrammatically in Fig. 2, and the switch is controlled by the weight of a cooking vessel and also in response to excessive temperature rise of the bottom of the vessel, as hereinafter described. It is to be understood that the mechanism could be actuated by portions of the vessel other than the bottom as long as the mechanism is positionable by a portion of the vessel and also temperature responsive thereto. As shown in Fig. 2 the switch 17 is serially included in the energizing circuit for the heating unit 13. The circuit also includes electrical elements within the control head 12, the conductors 18 extending to said elements through the hollow tower 11. Since the present invention is not concerned with the mechanism within the head 12, it is unnecessary to illustrate or describe such elements in this application.

Referring now to Figs. 1 and 3, the base 10 is preferably composed of sheet metal and is formed as illustrated to provide an enclosure for the mechanism now to be described. Within the base there are provided a number of brackets 19, preferably four, which are welded to the base and to which a movable bottom 20 is secured, as by means of screws 21 secured to supports 22. The latter may be formed of cushioning material, such as rubber, and serve to support the entire apparatus on a supporting surface as represented at 23.

As may be seen in Figs. 1 and 3 the base 10 has an annular channel 24 to accommodate the ring-shaped heating unit 13. The ends of the heating unit extend through apertures of a retaining member 25 which is suitably secured to the base, as by means of a fastening screw, and this member serves to retain a transverse pivot rod 26 which extends transversely of the ends of the heating unit and is welded thereto. In this manner the heating unit 13 is pivotally supported and may be raised to facilitate cleaning. As may be seen in Fig. 1, the heating unit is provided with two depending feet 27 which rest in the channel portion 24 of the base, so that the heating unit is horizontally disposed to receive a cooking vessel, the lower portion of which is represented in outline at 28 in Fig. 3.

The central portion 29 of base 10 is slightly dome-shaped and has a central opening with a depending flange 30. Below the portion 29 there is provided a transverse bracket 31 whose ends are fastened by means of screws 32 to supporting brackets 33 welded to the base 10. Centrally of the bracket 31 is a U-shaped portion 34 having a side opening 35. The switch 17, hereinbefore mentioned, is mounted on the bracket 31 to one side of the U-shaped portion 34. The switch comprises a lower rigid blade 36 carrying a contact 37, and a spring blade 38 carrying a contact 39 and having an insulating extension 40 secured thereto. This extension may comprise a flat piece of insulating material such as fiber or ceramic secured to the blade. As may be seen in Fig. 3 it extends through the opening 35. The switch blades 36 and 38 are supported by an insulator stack 41 secured to bracket 31 by means of screw 42.

Within the U-shaped portion 34 of bracket 31 is an upstanding rigid pin 43 whose lower end is secured to the bottom of the U-shaped portion 34, as by being riveted thereto at 44. At its upper end the pin 43 is formed to provide a head 45. A switch actuating or controlling member 46 is loosely slidably mounted on pin 43 and is urged upwardly by a helical spring 47 which surrounds the pin below the member 46. The upward movement of member 46 is limited by the head 45 of the pin 43. As may be clearly seen in Figs. 3 and 5, member 46 has a cylindrical portion 48, a flange 49 at the bottom of said portion, and a bevel portion 50 at the top of portion 48. The flange 49 is engageable with the rigid extension 40 of the spring blade 38 to control the switch 17 as hereinafter described.

Above the switch actuating member 46 there is a dome-shaped member 51, made preferably from chrome plated steel, which is disposed within the central opening of portion 29 of the base, and which has an outwardly turned bottom flange 52 engageable with the depending flange 30. A helical spring 53 urges member 51 upwardly, the upward movement being limited by the engagement of flanges 30 and 52. The lower end of spring 53 seats within upturned lugs 54 and 55 (see Fig. 4) provided on the bracket 31. The upper end of spring 53 engages the under surface of the dome-shaped member 51. The latter member carries a thermomotive element 56 (see Fig. 7) which is generally of inverted U-shape and which is a bimetallic element having the high expanding side on the inside of the U. As may be seen in Figs. 3 and 5, the element 56 is secured to member 51 by means of a rivet 57. The rivet is composed of a good heat conducting material such as aluminum, and it will be seen that element 56 is secured thereto in a manner to insure good heat conduction from the rivet to the element 56. It will be noted that the top surface of the rivet is disposed slightly above the dome of member 51 so that the vessel will engage the center high conductivity portion. The member 51 is made preferably from a material having relatively low heat conductivity and having a hard wear resistant surface. In this embodiment chrome plated steel is used. The wearing properties prevent galling of the dome during sliding of the pots thereon or between flange 30 and the sidewall of the member 51. The downwardly extending legs 59 of element 56 normally converge sufficiently for engagement with the bevel surface 50 of the switch actuating member 46. The ends of the legs 59 are turned outwardly to provide feet 60.

Considering the operation of the mechanism, when there is no cooking vessel on the heating unit 13, the mechanism is in the condition shown in Fig. 3. Although the switch 17 is self-closing by virtue of the self-bias of spring blade 38, the switch is held open by member 46 which is held in its uppermost position by the spring 47. It should be noted that member 51 is also held in its uppermost position by spring 53 and this member projects well above the top of the heating unit 13.

It may be assumed now that a cooking vessel, as represented in outline at 28 in Fig. 3, is placed upon the heating unit 13.

The weight of the vessel depresses member 51 against the upward force of its associated spring 53, causing said member to assume the position shown in Fig. 5. At the same time the feet of element 56 engage the bevel surface 50 of member 46 and move the latter downward against the force of its spring 47 to a position as shown in Fig. 5. This releases the rigid extension 40 and permits the switch 17 to close, thus permitting energization of the heating unit 13. In the absence of any excessive increase in temperature of the cooking vessel 28, the parts remain in the condition shown in Fig. 5 until such time as the vessel is removed, whereupon the parts return to the condition shown in Fig. 3, thus opening the switch 17.

It should be noted that the loose slidable mounting of member 46 and the cooperation of the bevel surface of member 46 with the feet of bimetallic element 56 permit easy alignment of the vessel-engaging member 51 with its associated mechanism disposed thereunder despite any misalignment of member 51. The use of a one piece member for element 56 with the above arrangement requires that the adjustment of the gap between the legs of said element be the only dimension that need be held to maintain the correct temperature of operation. The circular cross-section of rack portion of member 46, i. e., bevel surface 50, cylindrical portion 48 and flange 49 make this movable member obviate the necessity of providing indexing means to insure proper operation of the switch 17 by the bimetal element 50.

In the event of excessive temperature rise of the cooking vessel 28 during the cooking operation, the thermomotive element 56 functions to release member 46 so that the latter may open the switch 17. As stated above, during the cooking operation and in the absence of excessive temperature rise, the parts are disposed as shown in the solid line position of Fig. 5 and the switch 17 is closed. The characteristics of element 56 are such that it is primarily responsive to excessive temperature, and in response to such temperature its legs move outwardly as shown in the dotted line position of Fig. 5. The legs by their outward deflection permit member 46 to rise under the force of spring 47, as shown in Fig. 6. Consequently the flange 49 engages extension 40 and opens the switch 17. Thus the heating unit 13 is deenergized and the switch 17 is held open as long as the excess temperature condition exists and until such time as the cooking vessel is removed and again placed on the heating unit. If the cooking vessel is not removed, cooling thereof merely causes the legs 59 to move inwardly against the cylindrical portion 48 of member 46, as may be seen in Fig. 6. However if the cooking vessel is removed, member 51 moves upwardly to the position of Fig. 3, and the cooling of element 56 causes the legs thereof to return to normal position. Then when the cooking vesel is again placed on the heating unit, the parts are restored to the position of Fig. 5. Thus it will be seen that the mechanism is self-restoring after operation in response to an excessive temperature condition.

In selecting a material for bimetallic element 56 it was found of advantage to use a material having a low or negative deflection characteristic in the lower range of temperatures. In the preferred embodiment of this device, the element 56 was made of .015" material designated commercially as "Saflex," which is fully described in U. S. Patent No. 2,315,565, issued April 6, 1943. This material is preferred because of its negative deflection characteristic up to approximately 250° F. This permits easy calibration of the bimetal and further insures a lower biasing pressure between the legs 59 and the member 46, and, thereby, a lower frictional resistance to relative movement therebetween during resetting of these elements when the vessel is removed after an excessive temperature operation. The operation temperature of the element 56 is selected in the range of 550° F. to 600° F. so that the vessel can be used for ordinary pressure cooking operations or browning of foodstuffs such as meat without spurious deenergization of the heating unit 13.

While a particular embodiment of the invention has been illustrated and described, it is to be understood that the invention is not limited thereto but may be embodied in various other physical forms and structures.

We claim:

1. In an electric cooking apparatus, an electric heating unit on which a cooking vessel may be placed, a switch in circuit with said heating unit, mechanism operable by the outside surface of a cooking vessel to actuate said switch to permit energization of said heating unit circuit only when a cooking vessel is placed into position on the heating unit, and further operable to permit switch actuation to maintain said circuit in deenergized condition in response to excessive temperature rise of the cooking vessel, and means operative upon removal of said cooking vessel to automatically reset said mechanism so that subsequent replacement of said cooking vessel will permit reenergization of said heating unit circuit.

2. In an electric cooking apparatus, an electric heating unit on which a cooking vessel may be placed, a switch in circuit with said heating unit and biased toward closed condition, a spring-biased actuator for said switch normally holding the switch open, a spring-biased member depressible by the outside surface of a cooking vessel, and a thermomotive element carried by said member and normally engageable with said actuator to render it ineffective upon depression of said member, thus permitting said switch to close, said element responding to excessive temperature rise of said vessel and disengaging itself from said actuator, thereby causing the biasing spring of the actuator to hold the latter in open-switch position.

3. In an electric cooking apparatus, an electric heating unit on which a cooking vessel may be placed, a switch in circuit with said heating unit and biased toward closed condition, a spring-biased actuator for said switch normally holding the switch open, a spring-biased member depressible by the outside surface of a cooking vessel, and a thermomotive element carried by said member and normally engageable with said actuator to render it ineffective upon depression of said member, thus permitting said switch to close, said element responding to excessive temperature rise of said vessel and disengaging itself from said actuator, thereby causing the biasing spring of the actuator to hold the latter in open-switch position, and said spring-biased member being operative upon removal of said cooking vessel to move the thermomotive element relative to said actuator to thereby automatically reset said actuator and member so that subsequent replacement of said cooking vessel will permit reclosing of said switch.

4. In an electric cooking apparatus, an electric heating unit on which a cooking vessel may be placed, a switch in circuit with said heating unit and biased toward closed condition, a loosely-mounted spring-biased actuator for said switch normally holding the switch open, a spring-biased member depressible by the outside surface of a cooking vessel, and an inverted U-shaped thermomotive element carried by said member, with which element said actuator is self-alignable, said element being normally engageable with said actuator to render it ineffective upon depression of said member, thus permitting said switch to close, said element responding to excessive temperature rise of said vessel and disengaging itself from said actuator, thereby causing the biasing spring of the actuator to hold the latter in open-switch position, and said spring-biased member being operative upon removal of said cooking vessel to move the thermomotive element relative to said actuator to thereby automatically reset said actuator and member so that subsequent replacement of said cooking vessel will permit reclosing of said switch.

5. In an electric cooking apparatus, an electric heating unit on which a cooking vessel may be placed, a switch in circuit with said heating unit and biased toward closed condition, a spring-biased actuator for said switch, said actuator being loosely slidably mounted and having a bevelled surface, a cylindrical portion and a flange portion, the latter portion normally holding the switch open, a spring-biased member depressible by the outside surface of a cooking vessel, and an inverted U-shaped thermomotive element carried by said member, with which element said actuator is self-alignable, said element having outwardly turned feet normally engaging said bevelled surface to render said actuator ineffective upon depression of said member, thus permitting said switch to close, said element responding to excessive temperature rise of said vessel and disengaging its feet from the bevelled surface of said actuator, thereby causing the biasing spring of the actuator to hold the latter in open-switch position, and said spring-biased member being operative upon removal of said cooking vessel to move the thermomotive element relative to said actuator to thereby automatically reset said actuator and member so that subsequent replacement of said cooking vessel will permit reclosing of said switch.

6. In an electric cooking apparatus, an electric heating unit on which a cooking vessel may be placed, an inverted cup-shaped member mounted for vertical movement and spring-biased upwardly, a thermomotive element within said cup-shaped member, a rivet of high heat conductivity material securing said element to said member, said rivet having its top surface disposed above that of said member for engagement with the bottom of a cooking vessel, said rivet forming a good heat conductive path from the bottom of the cooking vessel to said element, and a switch in circuit with said heating unit and controlled by said element.

7. In an electric cooking apparatus, a horizontal supporting base having an annular channel and an upwardly protuberant central portion, the latter portion being apertured and having a depending flange, an electric heating unit of the ring type supported in said channel to receive a cooking vessel, an inverted cup-shaped member disposed within the aperture of said central portion and spring-biased upwardly, said member having a flange engageable with said depending flange to limit the upward movement of said member, a thermomotive element within said cup-shaped member, a rivet of high heat conductivity material securing said element to said member, said rivet having its top surface disposed above that of said member for engagement with the bottom of a cooking vessel, said rivet forming a good heat conductive path from the bottom of the cooking vessel to said element, and a switch in circuit with said heating unit and controlled by said element.

8. In an electric cooking apparatus, a supporting structure, an electric heating unit supported thereby to receive a cooking vessel, a switch mounted on said structure and connected in circuit with said heating unit, a controlling member for said switch supported by said structure for movement between a switch-opening position and a switch-closing position, spring means urging said member to the switch-opening position, a spring-biased member mounted on said structure and movable by the weight of a cooking vessel placed on said heating unit, and thermomotive means on said last-recited member engageable with said first member to actuate the same to the switch-closing position, said thermomotive means being self-disengageable from said first member in response to excessive temperature rise of the bottom of said vessel, thereby to permit said first member to move to the switch-opening position.

9. In an electric cooking apparatus, a horizontal supporting structure, an electric heating unit supported thereby to receive a cooking vessel, a switch mounted on said structure below said unit and connected in circuit therewith, a controlling member for said switch supported by said structure below said unit for vertical movement between an upper switch-opening position and a lower switch-closing position, spring means arranged to urge said member upward to the switch-opening position, a second member supported by said structure for vertical movement above said first member, spring means urging said second member upward for engagement by a cooking vessel placed on said heating unit, said second member being depressible by the weight of the vessel, and a thermomotive element depending from said second member for engagement with said first member to move the latter to the switch-closing position, said thermomotive element being self-disengageable from said first member in response to excessive temperature rise of the bottom of said vessel, thereby to permit said first member to move to the switch-opening position.

10. In an electric cooking apparatus, a horizontal supporting structure, an electric heating unit supported thereby to receive a cooking vessel, a switch mounted on said structure below said unit and connected in circuit therewith, said switch comprising a lower fixed contact and an upper spring contact blade self-biased downwardly and having an operating extension, a controlling member for said switch supported by said structure below said unit for vertical movement between an upper switch-opening position and a lower switch-closing position, said member having a portion engageable with said extension when moving upwardly to open the switch, spring means arranged to urge said member upward to the switch-opening position, a second member supported by said structure for vertical movement above said first member, spring means urging said second member upward for engagement by a cooking vessel placed on said heating unit, said second member being depressible by the weight of the vessel, and a thermomotive element depending from said second member for engagement with said first member to move the latter to the switch-closing position, said thermomotive element being self-disengageable from said first member in response to excessive temperature rise of the bottom of said vessel, thereby to permit said first member to move to the switch-opening position.

11. In an electric cooking apparatus, a horizontal supporting structure, an electric heating unit supported thereby to receive a cooking vessel, a switch mounted on said structure below said unit and connected in circuit therewith, a vertical pin fixedly supported by said structure adjacent said switch, a controlling member for said switch slidable on said pin between an upper switch-opening position and a lower switch-closing position, a helical spring surrounding said pin below said member and urging the latter upwardly to the switch-opening position, a second member supported by said structure for vertical movement above said first member, spring means urging said second member upward for engagement by a cooking vessel placed on said heating unit, said second member being depressible by the weight of the vessel, and a thermomotive element depending from said second member for engagement with said first member to move the latter to the switch-closing position, said thermomotive element being self-disengageable from said first member in response to excessive temperature rise of the bottom of said vessel, thereby to permit said first member to move to the switch-opening position.

12. In an electric cooking apparatus, a horizontal supporting structure, an electric heating unit supported thereby to receive a cooking vessel, a switch mounted on said structure below said unit and connected in circuit therewith, a controlling member for said switch supported by said structure below said unit for vertical movement between an upper switch-opening position and a lower switch-closing position, spring means arranged to urge said member upward to the switch-opening position, a second member supported by said structure for vertical movement above said first member, spring means urging said second member upward for engagement by a cooking vessel placed on said heating unit, said second member being depressible by the weight of the vessel, and a thermomotive element secured to said second member and having a pair of depending legs for engagement with said first member to move the latter to the switch-closing position, said legs being self-disengageable from said first member in response to excessive temperature rise of the bottom of said vessel, thereby to permit said first member to move to the switch-opening position.

13. In an electric cooking apparatus, an electric heating unit on which a cooking vessel may be placed, a switch in circuit with said heating unit, operating means for said switch, a spring-biased member depressible by the outer surface of a cooking vessel, and a thermomotive element carried by said member and engageable with said switch-operating means to effect closure of said switch upon depression of said member, said element responding to excessive temperature rise of said vessel and disengaging itself from said switch-operating means to effect opening of said switch, said element upon removal of said vessel resetting itself for subsequent operation when a cooking vessel is again placed on the heating unit.

ROBERT J. WAGNER.
HARVEY E. HORTMAN, Jr.

References Cited in the file of this patent
UNITED STATES PATENTS

| Number | Name | Date |
|---|---|---|
| 799,377 | Harden | Sept. 12, 1905 |
| 1,064,358 | Melter | June 10, 1913 |
| 1,678,885 | Thomas | July 31, 1928 |
| 1,947,232 | Smith | Feb. 13, 1934 |
| 2,020,364 | Lehman | Nov. 12, 1935 |
| 2,269,689 | Reichold | Jan. 13, 1942 |
| 2,410,013 | Clark | Oct. 29, 1946 |
| 2,410,014 | Clark | Oct. 29, 1946 |
| 2,427,945 | Clark et al. | Sept. 23, 1947 |
| 2,430,196 | Vaughan | Nov. 4, 1947 |
| 2,430,715 | Grayson | Nov. 11, 1947 |